March 19, 1935. J. B. POWERS 1,995,042
EXPANSION JOINT
Filed May 22, 1933 2 Sheets-Sheet 1

INVENTOR:
James B. Powers,
BY Bodell + Thompson
ATTORNEYS.

March 19, 1935.  J. B. POWERS  1,995,042
EXPANSION JOINT
Filed May 22, 1933   2 Sheets-Sheet 2
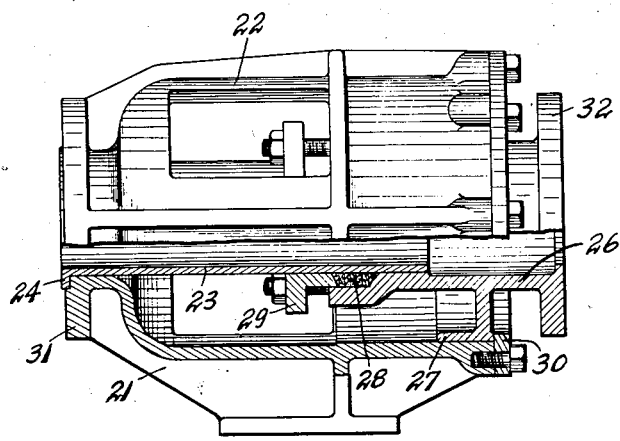
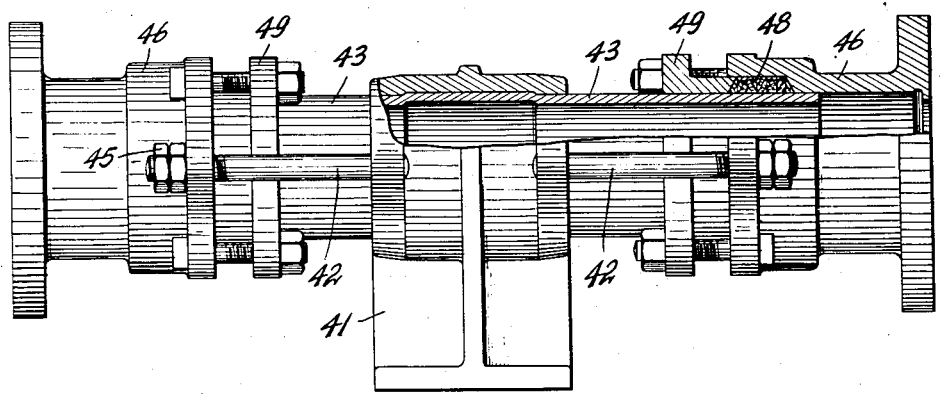
INVENTOR:
James B. Powers,
BY Bodell & Thompson
ATTORNEYS.

Patented Mar. 19, 1935

1,995,042

UNITED STATES PATENT OFFICE 1,995,042

EXPANSION JOINT

James B. Powers, Syracuse, N. Y., assignor to The Direct Separator Company, Inc., Syracuse, N. Y., a corporation of New York Application May 22, 1933, Serial No. 672,163

5 Claims. (Cl. 285—162)

This invention relates to expansion joints for compensating for expansion and contraction due to changes in temperature in pipe lines, as steam and hot water pipe lines, and has for its object an expansion or slip joint wherein the relation between the packing and the guide for the movable member of the joint remains constant in all positions, that is, the relation does not change during movements or during the expansion or contraction of the joint.

It further has for its object an expansion joint in which the body is a unitary rigid or one-piece structure with the slip tube stationary therein and the movable or expansion member or members guided by the rigid body. The term "rigid one-piece body" is used in contradistinction to a body consisting of sections bolted together wherein misalinements develop between the sections so bolted together, resulting in lateral strains on the packing of the joint and on the tube, and hence one of the objects of the invention is an expansion or slip joint in which the packing and tube are relieved of all lateral strains.

It further has for its object an expansion joint in which the packing or gland slides along the fixed tube in contradistinction to a packing stationary with the body and a tube slidable thereon.

It further has for its object a construction wherein the packing gland so sliding during the expansion and contraction of the joint can be readily adjusted in all positions thereof.

The invention consists in the novel features and in the combinations and constructions hereinafter set forth and claimed.

In describing this invention, reference is had to the accompanying drawings in which like characters designate corresponding parts in all the views.

Figure 2 is an elevation, partly in section, of a single expansion joint.

Figure 3 is a modified form of a double expansion joint.

Figure 1:
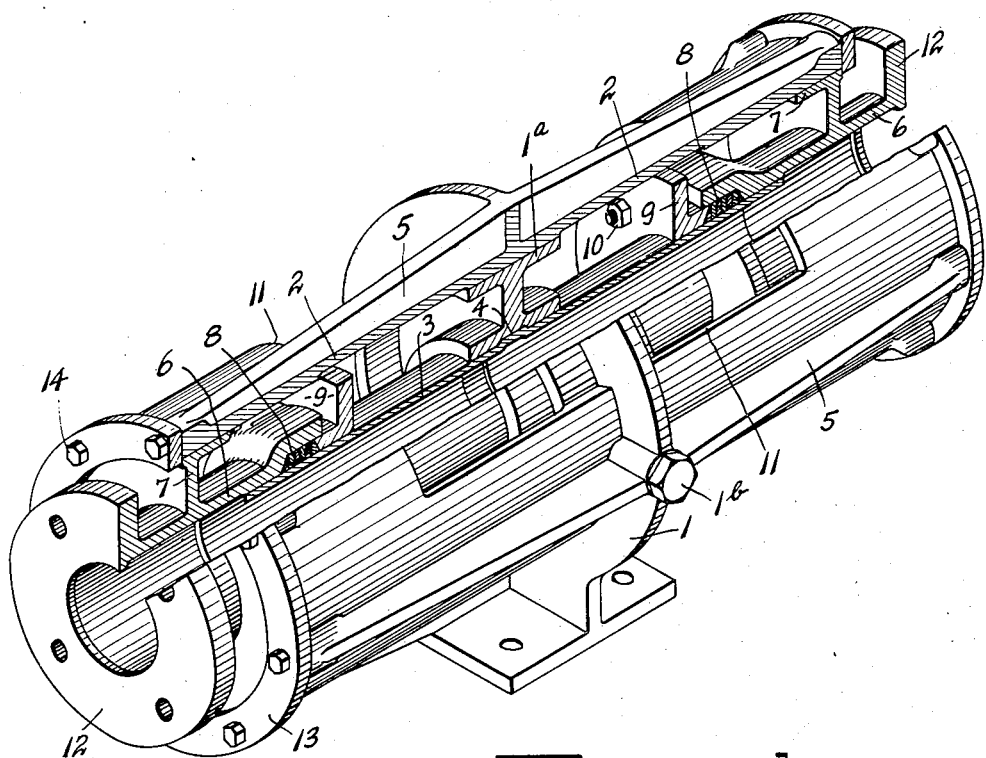
Figure 1 is an isometric view, partly in section, of a double expansion joint embodying my invention.

1 designates the body, which is formed with integral cylindrical portions 2 on opposite sides thereof. 3 designates a slip tube mounted in the body and extending coaxially thereof and of the cylindrical portions 2, the cylindrical portions being of greater diameter than the tube providing annular spaces around the end portions of the tube projecting from the body. The tube is secured to the body in any suitable manner, as here illustrated in Figure 1, the body is formed with an internal annular groove 4 and an intermediate portion of the tube expanded into the groove to secure the tube against endwise movement. For the purpose of manufacturing economically the groove 4 is formed in an insert 1ª fitting in the cylindrical portions 2 and fixedly secured to the major part of the body as by clamp or set screws 1ᵇ. The body and the cylindrical portions thereof are provided with suitable webs 5 extending lengthwise thereof to stiffen the same against warping under the weight of the pipe coupled to the body in communication with the tube 3.

6 designates expansion coupling members slidable in the cylindrical portions 2 of the body and also slidable on the peripheries of the end portions of the tube 3, these members 6 having passages which telescopically receive the end portions of the tube 3. The members 6 are guided in the cylindrical portions 2 of the body and are here shown as provided with pistons or heads 7 at their outer ends of greater diameter than the tube, slidably engaging the cylindrical portions 2 of the body. In order to form a water and steam tight joint between the member 6 and the tube 3, a packing gland is provided which shifts with each member 6. This gland includes suitable packing 8 and a member 9 adjustably secured to each member 6, as by nuts 10, threading on studs or bolts projecting from the inner end of the member 6. The pistons or heads 7 slide in full portions of the cylindrical portions 2 and the nuts 10 are accessible through openings 11 in said portions 2. Hence, the nuts are accessible for adjusting the packing in any position of the member 6 relative to the tube 3.

By reason of the heads 7 guided in the cylindrical portions 2 of the body and the packing gland carried by the member 6, the relative position or the angular relation of the packing and the guiding heads 7 is the same in all positions of the member 6 on the tube 3. Owing to the heads or pistons 7 guided in the cylindrical portions 2, the supporting strains due to the weight of the pipes coupled to the member 6 is borne by the body or the cylindrical portions thereof and the packing 8 relieved of all supporting and lateral strains, hence undue wearing and distortion of the packing is avoided and adjustment of the packing is necessary only at long intervals.

Each of the members 6 is provided with an annular flange 12 at its outer end for coupling to a pipe provided with a similar flange. Usually, the two flanges are connected together by bolts. In order to prevent outward displacement of each member 6 from the body 1 or the cylindrical portion 2 thereof after said member has been assembled in the body, a detachable stop is provided at each end of the body 1, this stop being here shown as a ring 13 abutting against each end of the body or the cylindrical portions 2 thereof with its inner margin projecting into the path of the head or piston 7, the ring 13 being secured to the body 1 or the cylindrical portion 2 thereof in any suitable manner, as by cap screws 14.

In operation, during expansion and contraction, the members 6 slide along the tube 3 and are held in alinement without transferring strains to the tube 3 by the heads or pistons 7 which are guided in the body.

In Figure 2 a single expansion joint is shown in which 21 designates the body having a cylindrical portion 22 and 23 is the slip tube extending into the body from one end thereof and having an external annular shoulder 24 at its outer end which holds the tube from axial movement in one direction. The tube in this construction is fitted into the end wall of the cylindrical portion 22 by a drive-fit. 26 designates the sliding member corresponding to the member 6 in Figure 1, this sliding on the inner end of the tube 23. The head or piston 27, packing 28, gland member 29 and shoulder 30 are the same as the corresponding parts 7, 8, 9 and 13 (Figure 1). One of the pipes connected by the joint is bolted to a flange 31 at one end of the body and the other of such pipes is bolted to a flange 32 on the member 6 corresponding to the flange 12 on the member 6.

In Figure 3, a double expansion joint is shown in which 41 designates the body, 43, the slip tube mounted in the body and held against endwise movement, as in Figure 1. 46 designates the sliding members which are coupled to the pipes connected together by the joint, these carrying a packing 48 and gland member 49 coacting with the tube 43 in substantially the same manner as shown in Figure 1. These members 46 are supported and guided by the body 41 by means of studs or rods 42 rigid with the body 41, each member 46 having passages through which the rods extend, the members 46 being slidable along the rods as well as along the tube during expansion and contraction of the joint. The outward displacement of the members 46 off the rods or studs 42 is prevented by suitable adjustable shoulders, as nuts 45, threading on the studs. In this form of my invention, also the relation of the packing to the guiding means does not change during the expansion and contraction of the joint.

What I claim is:

1. An expansion joint comprising a rigid stationary, supporting body, a tube rigidly mounted in the body and held from endwise movement, the body being provided with a guide concentric with the tube and spaced apart in a radial direction from the tube, a member having means for coupling it to a pipe in communication with the tube, said member having a passage for telescopically receiving the tube and also having a head slidable along the guide, said member having a packing gland coacting with the periphery of the tube, said gland and the head where it coacts with the guide being spaced apart in a direction lengthwise of the tube, whereby the relative location of said bearing points on the tube remain constant in all positions of the joint.

2. An expansion joint comprising a rigid stationary, supporting body, a tube rigidly mounted in the body and held from endwise movement, the body having a cylindrical guide portion concentric with the tube and spaced therefrom forming a guide, a member having means for coupling it to a conduit in communication with the tube, said member being formed with a head at its outer end coacting with the cylindrical guide portion of the body and slidable along the same and a passage for telescopically receiving the tube and having a packing gland at its inner end engaging the tube, whereby said gland and the head are spaced apart in a direction lengthwise of the tube and the relative position of each to the other remains the same during expansion and contraction of the joint.

3. An expansion joint comprising a rigid stationary, supporting body, a tube rigidly mounted in the body and held from endwise movement, the body having a cylindrical portion concentric with the tube and spaced therefrom forming a guide, a member having means for coupling it to a conduit in communication with the tube, said member being formed with a head at its outer end coacting with the cylindrical portion of the body and slidable along the same and a passage for telescopically receiving the tube and having a packing gland at its inner end engaging the tube, whereby said gland and the bearing of the gland on the cylindrical portion are spaced apart in a direction lengthwise of the tube and the relative position of each to the other remains the same during expansion and contraction of the joint, the cylindrical portion of the body being formed with openings through which the gland is accessible.

4. An expansion joint comprising a one-piece rigid stationary, supporting body, a tube rigidly mounted in the body, and held from endwise movement, the body having a cylindrical guide portion of greater diameter than the tube providing an annular space around the tube and said portion being open at the outer end of the body, a member having means for coupling it to a conduit in communication with the tube, said member being formed with a head slidable in the body and coacting with a cylindrical portion whereby the body supports and guides said member during expansion and contraction of the joint, said member being movable into the cylindrical guide through the end thereof and also having a passage telescopically receiving the tube and having a packing gland bearing on the periphery of the tube, the head being located at the outer end of said member and the gland at the inner end whereby the two bearing points are spaced apart in a direction lengthwise of the tube and remain in fixed relation to each other in any position of the joint.

5. An expansion joint comprising a one-piece rigid stationary, supporting body, a tube rigidly mounted in the body, and held from endwise movement, the body having a cylindrical guide portion of greater diameter than the tube providing an annular space around the tube and said portion being open at the outer end of the body, a member having means for coupling it to a conduit in communication with the tube, said member being formed with a head slidable in the body and coacting with a cylindrical portion whereby the body supports and guides said member during expansion and contraction of the joint, said member also having a passage telescopically receiving the tube and having a packing gland bearing on the periphery of the tube, the head being located at the outer end of said member and the gland at the inner end whereby the two bearing points are spaced apart in a direction lengthwise of the tube and remain in fixed relation to each other in any position of the joint, a retaining ring at the outer end of the body for limiting the outward movement of the head, and said member having an annular flange for coupling it to a pipe for entering said retaining ring, when the joint is contracted.

JAMES B. POWERS.